Nov. 29, 1949  J. R. OLIVER  2,489,430
DIAL DISPLAY DEVICE FOR INDICATING MECHANISMS
Filed July 20, 1945  3 Sheets-Sheet 1

Inventor
John R. Oliver
By his Attorney

Nov. 29, 1949     J. R. OLIVER     2,489,430
DIAL DISPLAY DEVICE FOR INDICATING MECHANISMS
Filed July 20, 1945     3 Sheets-Sheet 2

Inventor
John R. Oliver
By his Attorney

Nov. 29, 1949　　　　　J. R. OLIVER　　　　　2,489,430
DIAL DISPLAY DEVICE FOR INDICATING MECHANISMS
Filed July 20, 1945　　　　　　　　　　　　3 Sheets-Sheet 3

*Inventor*
John R. Oliver
By his Attorney

Patented Nov. 29, 1949

2,489,430

UNITED STATES PATENT OFFICE 2,489,430

DIAL DISPLAY DEVICE FOR INDICATING MECHANISMS

John R. Oliver, Beverly, Mass., assignor to United Shoe Machinery Corporation, Flemington, N. J., a corporation of New Jersey Application July 20, 1945, Serial No. 606,046

3 Claims. (Cl. 116—129)

This invention relates to indicating mechanism and is herein illustrated in its application to apparatus comprising dials indicating compass bearings. The illustrated apparatus is intended for use on shipboard for directing the course of the ship and for taking compass bearings of heavenly bodies, the apparatus, in the latter case, being used in conjunction with instruments such as an alidade or an azimuth circle.

It is an object of the present invention to provide an apparatus of the class above described in which the dials are arranged for the greatest convenience of the observer with a view to expediting the taking of readings and increasing the accuracy thereof.

With the above object in view the present invention, in one aspect thereof, consists in the provision in apparatus of the class above described of a first rotor and a second rotor each of which consists of an annular dial on which are characters, a frusto-conical dial on which are characters, and a cylindrical mounting for said dials. In accordance with the usual practice the illustrated rotors are operated electrically from a magnetic compass located remotely from the illustrated apparatus. As usual in assemblies of this sort the two rotors are so operated as to provide a coarse reading and a fine reading of the compass bearing. In order to facilitate the reading of the dials the rotors are so constructed and arranged that the annular dials are coplanar and the frusto-conical dials together define the frustum of a cone. Cooperating with the frusto-conical dials in the illustrated apparatus is a transparent member facing said dials and having an index mark arranged to register with the characters on both of said dials. To facilitate the reading of the dials a reflector or prism is arranged to transmit an image of said index mark and the characters on the frusto-conical dials. In the illustrated apparatus the annular dials provide a convenient means for use with an alidade or azimuth circle in taking readings of the compass bearings of heavenly bodies and the frusto-conical dials provide a convenient means for taking compass readings for use in directing the course of the ship.

In accordance with a further feature of the invention the illustrated apparatus includes a water-tight closure or housing for said dials adapting the apparatus to use on the deck of a submarine. The illustrated housing includes a window through which the characters on the annular dials are visible and a similar window through which the images received by the prism are visible.

These and other features of the invention will now be described with reference to the accompanying drawings and pointed out in the appended claims.

Figure 1:
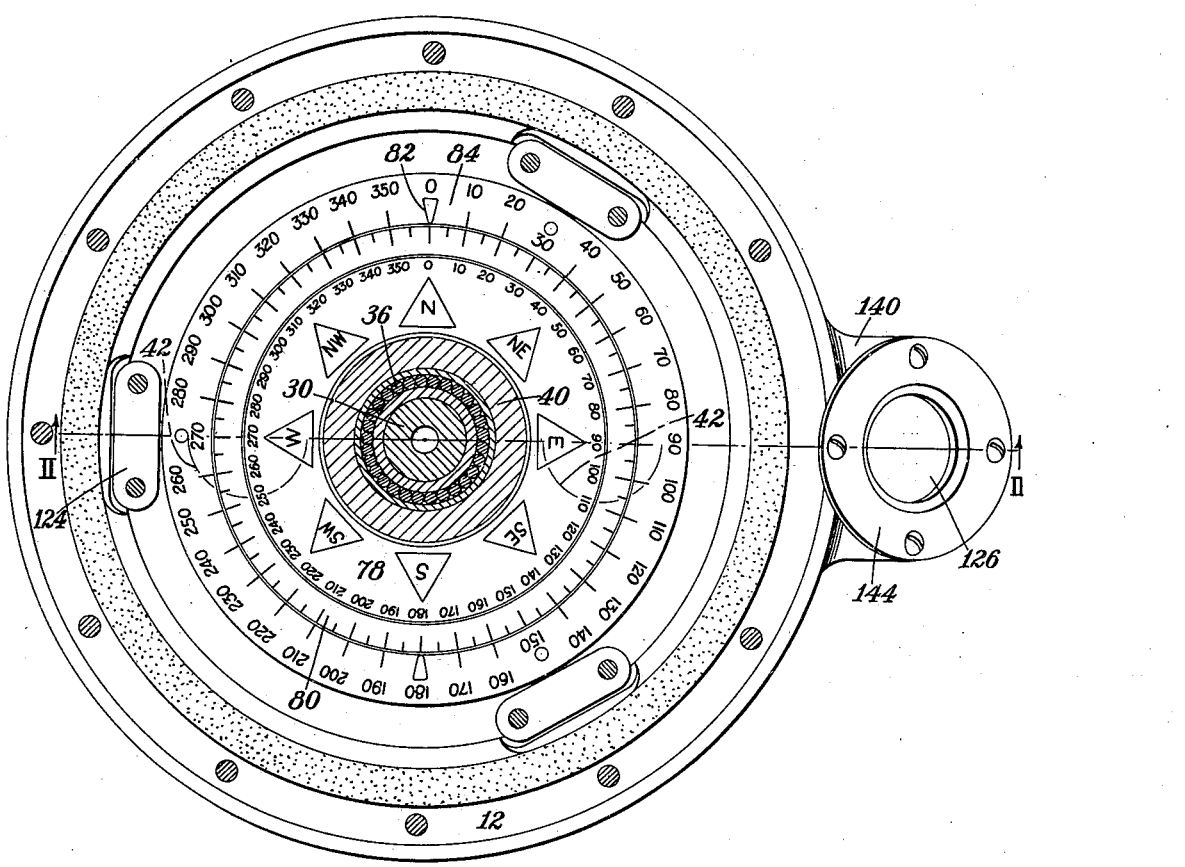
Fig. 1 is a plan view of mechanism in which the present invention is embodied, illustrating the plane dials and surrounding structure, the central shaft and its bearings being shown in section in the plane of the dials.
Figure 2:
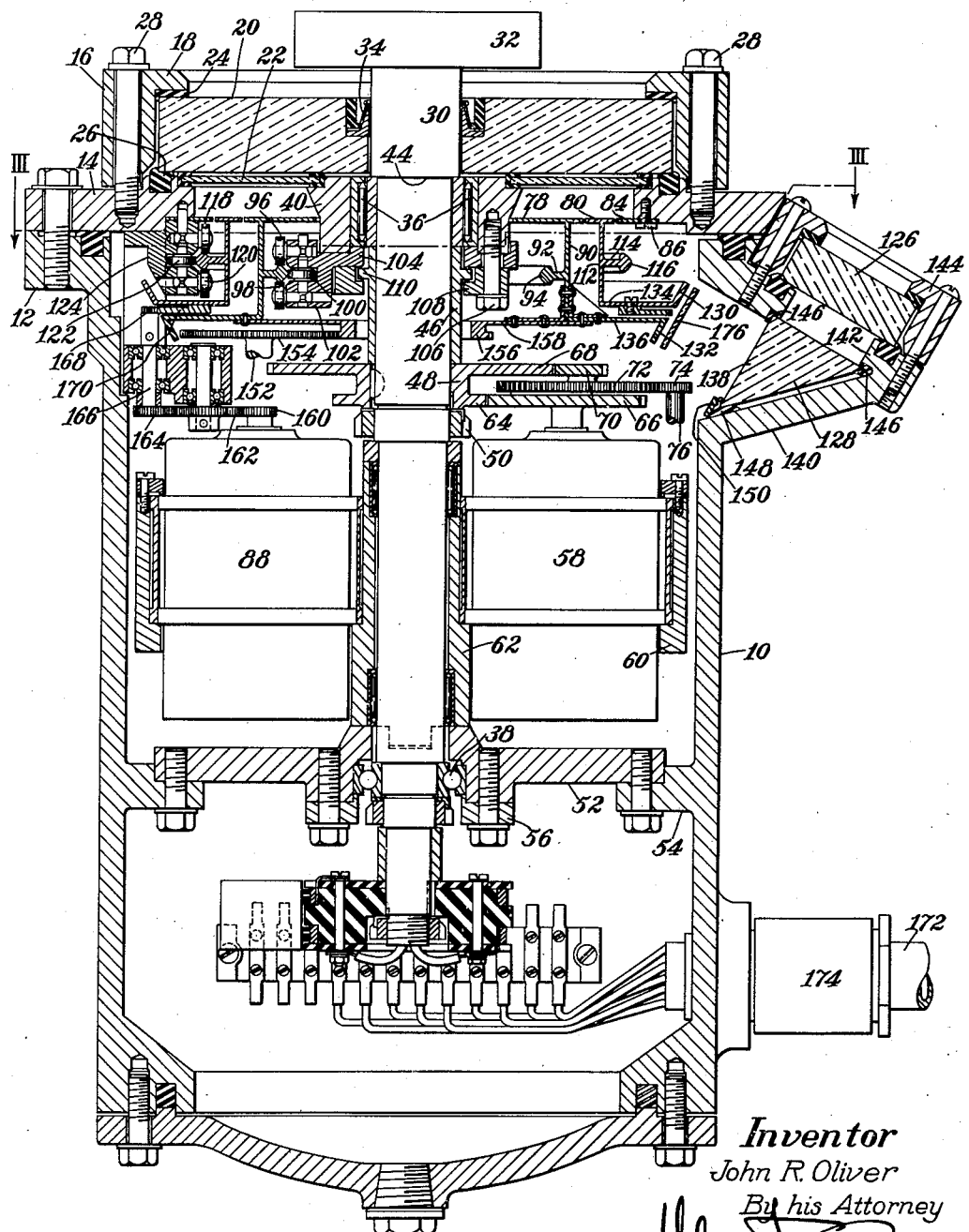
Fig. 2 is a section on the line II—II of Fig. 1 certain parts being shown transposed for convenience of illustration.
Figure 3:
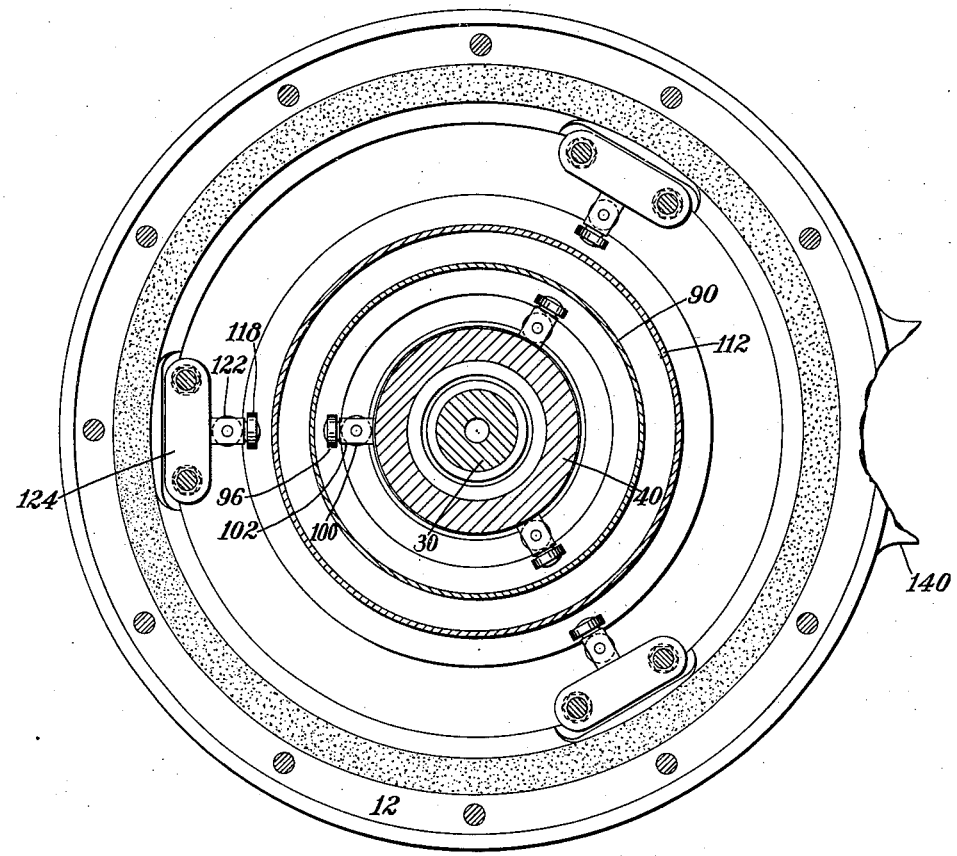
Fig. 3 is a section on line III—III of Fig. 2, the prism housing being broken away.

Referring to Fig. 2 the numeral 10 indicates a cylindrical water-tight housing enclosing the dials and operating mechanisms. Said housing may be rigidly secured, for example to the deck of a ship, or alternatively it may be suspended on gimbals similarly to the housing illustrated in my copending application for United States Letters Patent Serial No. 573,799, filed January 20, 1945. Bolted to an outwardly extending flange 12 at the top of the housing is an annular plate 14 having concentrically mounted thereon a cylindrical ring 16 having an inwardly extending flange 18, said ring providing a clamping means for an annular window 20 which, as herein illustrated, is of sufficient thickness to withstand the water pressure to which it would be subjected when the apparatus is permanently mounted on the deck of a submarine. To prevent reduced visibility through the window by condensation of moisture on its bottom surface a thin annular window 22 is mounted below and adjacent to the window 20. The window assembly is made water-tight by suitable resilient gaskets 24 and 26 which are held under pressure by clamping screws 28 securing the ring 16 to the plate 14. Extending through the opening in the center of the window 20 is a hollow shaft 30 having a cylindrical head 32 which provides a mounting for an instrument for determining the relative bearing of a target such, for example, as an enemy ship. Alternatively the head 32 may serve as a mounting for instruments of navigation such as a pelorus, an alidade or an azimuth circle. The opening in the window 20 for the shaft 30 is sealed against the passage of water by a garter spring seal 34 mounted in a counterbore in the window. The shaft 30 is journaled near its upper end in roller bearings 36 and near its lower end in ball bearings 38. The ball bearings 38 also take the downward thrust created by the weight of the shaft and an instrument mounted on the head 32. The roller bearings 36 are mounted in a hub 40 connected to the plate 14 by a web 42 indicated by broken lines in Fig. 1. The roller bearings 36 are positioned lengthwise of the shaft 30 between a shoulder 44 formed in said shaft and a sleeve 46 mounted on said shaft below the roller bearings. The sleeve 46 is supported against downward movement by a nut 50 on a threaded portion of the shaft 30, said nut serving to clamp the parts mounted on the shaft 30 above said nut against the shoulder 44. The ball bearings 38 are mounted in a recess or socket in the hub of a plate 52 secured to a flange 54 projecting inwardly from the cylindrical wall of the housing, said ball bearings being retained in position in said socket by a ring 56.

A suitable electrical transmission system is provided for transmitting to a control room located in a position remote from the illustrated apparatus, the angle of the line of sight of an instrument mounted on the head 32 of the shaft 30 to the lubber line of the ship. The illustrated transmission means comprises a "Selsyn" system, so called, of the type illustrated in United States Letters Patent No. 1,612,117, granted December 28, 1926, upon an application filed in the name of Edward M. Hewlett et al. The illustrated "Selsyn" system comprises two synchronous generators, one of which is identified in Fig. 2 by the numeral 58. Said generators, together with two synchronous motors, provided for a purpose hereinafter described, are mounted between a ring 60 and a cylindrical member 62 mounted on the shaft 30 and supported against downward movement by the hub of the plate 52. The angular movement of the instrument mounted on the head 32 rotates the shaft 30 and the shaft in turn actuates the synchronous generators through suitable gearing. As herein illustrated, said gearing includes gears 64 and 68 mounted on a common hub 48 keyed to the shaft 30. For actuating the generator 58 the gear 64 meshes with a gear 66 on the generator shaft. For actuating the other generator (not shown) the gear 68 operates through gears 70, 72 and 74 to turn the generator shaft 76. In the illustrated organization the generator 58 is rotated at a ratio of 1:1 to the shaft 30 while the second generator is rotated at a ratio of 36:1. As usual, in "Selsyn" systems of the type above described, the two generators operate two synchronous motors (not shown) in a control room located remotely from the illustrated apparatus and said motors operate two dials providing a coarse reading and a fine reading of the angle of the line of sight of the instrument on the head 32 to the lubber line of the ship.

For purposes of navigation the illustrated apparatus is provided with a central compass dial 78 (Fig. 1) and an annular compass dial 80 concentrically positioned relatively to the dial 78. The compass dials are read by reference to a pointer 82 on a fixed dial 84 secured to the bottom surface of the plate 14 by screws one of which is indicated by the numeral 86 in Fig. 2. The central compass dial 78 is operated by a synchronous motor (not shown), being one element of a "Selsyn" system actuated by a gyrocompass located in a position remote from the illustrated apparatus. Said motor operates at a 1:1 ratio to the dial 78, actuating said dial through gearing hereinafter described. The annular dial 80 is operated by a synchronous motor 88 (Fig. 2) which, like the motor above referred to, is operated by a synchronous generator actuated by the gyrocompass. The motor 88 turns at a ratio of 36:1 relatively to the annular dial 80 actuating said dial through a reduction gearing hereinafter described whereby the annular dial is turned at substantially the same rate of speed as the central dial 78. The central dial provides a coarse reading of the compass bearing while the annular dial provides a fine reading which corrects any slight inaccuracies caused by lag or overthrow of the central dial. The central dial 78 is fixed to the upper edge of a cylinder 90 having an inwardly extending flange 92 terminating in a bead 94. To provide for rotation of the dial 78 about an axis common to the shaft 30 the bead 94 is mounted for rotary movement in three roller assemblies angularly spaced 120° apart about the shaft 30. Referring to Fig. 2, illustrating one of said roller assemblies, the bead 94 is held against upward and downward movement by rollers 96 and 98, respectively, and is held against movement toward the shaft 30 by a roller 100. The illustrated rollers are mounted in a bracket 102 projecting radially from a channeled ring 104 secured to the lower portion of the hub 40 by screws one of which is indicated by numeral 106 in Fig. 2. Said screws also serve to secure a ring 108 to the bottom face of the ring 104, said ring having an inwardly extending flange which engages a flange 110 of the sleeve 46. The ring 108 takes the downward thrust of the shaft 30 when the plate 52 which mounts the ball bearing 38 is dismounted and moved downwardly to permit the removal of one or more of the Selsyn units. The annular dial 80 is secured to the upper edge of a cylinder 112 having an outwardly extending flange 114 terminating in a bead 116. For rotation on an axis common to the shaft 30 said bead is mounted in three roller assemblies similar to the roller assembly above described. Referring to Fig. 2, illustrating one of the three roller assemblies, said assembly comprises rollers 118 and 120 which hold the bead 116 against upward and downward movement respectively, and a roller 122 arranged to hold said bead against movement away from the shaft 30. The three rollers are mounted in a bracket 124 secured to the bottom surface of the plate 14.

For the convenience of an observer employing the illustrated apparatus as a means for obtaining compass bearings for use in directing the course of the ship the apparatus is so constructed that an observer by looking through an angularly disposed window 126 can read the compass bearing in a prism 128. The numerals observed in the prism are reflected from two frusto-conical dials 130 and 132, the dial 130 being the upturned margin of an outwardly extending flange 134 of the cylinder 112 and the frusto-conical dial 132 being the downturned margin of an outwardly extending flange 136 of cylinder 90. It will be understood that the dials 130 and 132 have inscribed thereon markings similar to the markings on the dials 78 and 80 as shown in Fig. 1. It will be seen from Fig. 2 that the frusto-conical dials 130 and 132 are spaced equally distant from the prism 128. Otherwise stated, said dials are so arranged that together they define the frustrum of a single cone the surface of which lies parallel to the inner face 138 of the prism. For mounting the window 126 and the prism 128 the housing 10 has an outward extension having an upper angular surface provided with an opening 142 with which the window registers. The window is clamped in position above said opening by a flanged ring 144, suitable gaskets being mounted above and below the margin of the window to seal the opening against the passage of water under pressure. The prism 128 is supported by suitable angle plates 146 seated in suitable recesses in the extension 146 of the housing and held in position by a third angle plate 148 secured to the inner surface of the housing by a retaining plate 150. For providing a reference mark for reading the compass bearing from the frusto-conical dials 130 and 132 a transparent plate 176 is mounted in a suitable bracket (not shown) and arranged in parallel relation to the dials 130 and 132 and provided with a suitable index line whereby the compass reading may be accurately taken from said dials.

For transmitting the rotation of the synchronous motor of the 1:1 system to the dial 78 and the frusto-conical dial 132 the motor shaft 152 has secured thereto a spur gear 154 which meshes with a gear 156 the hub of which has an outwardly extending wide flange 158 rigidly secured to the outwardly extending flange 136 of the cylinder 90. For transmitting the rotation of the motor 88 to the annular dial 80 and the frusto-conical dial 130 the motor shaft has secured thereto a gear 160 which operates through an idler gear 162 to rotate a gear 164 fixed to a short vertical shaft 166 having fixed to its upper end a pinion 168 which meshes with gear teeth in an annular plate 170 secured to the outwardly extending flange 134 of the cylinder 112.

The wiring for the synchronous generators and motors in the housing 10 is encased in a conduit 172 mounted in a suitable packing gland 174 fixed in the base of the housing and provided with means for sealing the opening against water under pressure. In addition to the wiring for the generators and motors the cable 172 may also contain wiring for a signal switch and/or other electrical units such as a lamp for illuminating a reticle in a pair of binoculars or a telescope. The wires for the apparatus mounted on the head 32 of the shaft 30 are preferably led upwardly through the hollow central portion of the shaft 30, the upper portion of the central opening in the shaft being suitably sealed after the wires have been brought into position.

In employing the illustrated apparatus as an aid to navigation the head 32 serves as a mount for instruments such as an alidade and an azimuth circle. Preferably the instrument is so mounted on the head 32 that a beam of light from the sun or other heavenly body is reflected downwardly by the instrument through the window 20 and onto the compass dials 78 and 80 thus indicating the compass bearing of such heavenly body. It will be seen from Fig. 1 that the web 42 restricts the space on the compass dials available for taking such readings. In most cases this will be of no consequence because there will be two observation stations, one fore and one aft, each provided with the illustrated apparatus, the two units being so arranged relatively to each other that together they provide for readings of the compass bearings of bodies at any point in the sky.

Having thus described my invention, what I claim as new and desire to secure by Letters Patent of the United States is:

1. Indicating mechanism comprising a first rotor and a second rotor, each of which consists of an annular dial on which are characters, a frusto-conical dial on which are characters and a cylindrical mounting for said dials; and means for so mounting said rotors that the annular dials are coplanar and the frusto-conical dials together define the frustum of a cone.

2. Indicating mechanism comprising a first rotor and a second rotor, each of which consists of an annular dial on which are characters, a frusto-conical dial on which are characters and a cylindrical mounting for said dials; means for so mounting said rotors that the annular dials are coplanar and the frusto-conical dials together define the frustum of a single cone, and a transparent member facing said frusto-conical dials and having an index mark arranged to register with the characters on both of said frusto-conical surfaces.

3. Indicating mechanism comprising a first rotor and a second rotor, each of which consists of an annular dial on which are characters, a frusto-conical dial on which are characters and a cylindrical mounting for said dials; means for so mounting said rotors that the annular dials are coplanar and the frusto-conical dials together define the frustum of a single cone, a transparent member facing said frusto-conical surfaces and having an index mark arranged to register with the characters on both of said frusto-conical surfaces, a reflector for transmitting an image of said index mark and the characters on said frusto-conical dials, and a housing for said indicating mechanism having a first window through which said image is visible and a second window through which the characters on the annular dials are visible.

JOHN R. OLIVER.

REFERENCES CITED

The following references are of record in the file of this patent:

UNITED STATES PATENTS

| Number | Name | Date |
|---|---|---|
| 1,027,549 | Kronert | May 28, 1912 |
| 1,396,607 | Von Post | Nov. 8, 1921 |
| 1,518,786 | Griswold | Dec. 9, 1924 |
| 1,701,028 | Buckingham | Feb. 5, 1929 |
| 1,972,889 | Hayes | Sept. 11, 1934 |
| 1,977,954 | Reichel | Oct. 23, 1934 |
| 2,008,481 | Weber et al. | July 16, 1935 |
| 2,018,536 | Salzgeber | Oct. 22, 1935 |
| 2,085,010 | Dillon | June 29, 1937 |
| 2,087,086 | Beeson | July 13, 1937 |
| 2,153,565 | Isaacson | Apr. 11, 1939 |
| 2,161,871 | Kollsman | June 13, 1939 |
| 2,172,166 | Lange | Sept. 5, 1939 |
| 2,446,258 | Burt | Aug. 3, 1948 |

FOREIGN PATENTS

| Number | Country | Date |
|---|---|---|
| 84,291 | Switzerland | Mar. 1, 1920 |